July 23, 1935.　　　S. E. LEONARD, JR　　　2,008,832
METHOD OF RATING AND COMPARING QUANTITIES
Filed June 26, 1933　　　5 Sheets-Sheet 1

INVENTOR.
Samuel E. Leonard, Jr.
BY
ATTORNEY.

July 23, 1935.  S. E. LEONARD, JR  2,008,832
METHOD OF RATING AND COMPARING QUANTITIES
Filed June 26, 1933   5 Sheets-Sheet 2

INVENTOR.
Samuel E. Leonard Jr.
BY Fisher, Moser + Moore
ATTORNEY.

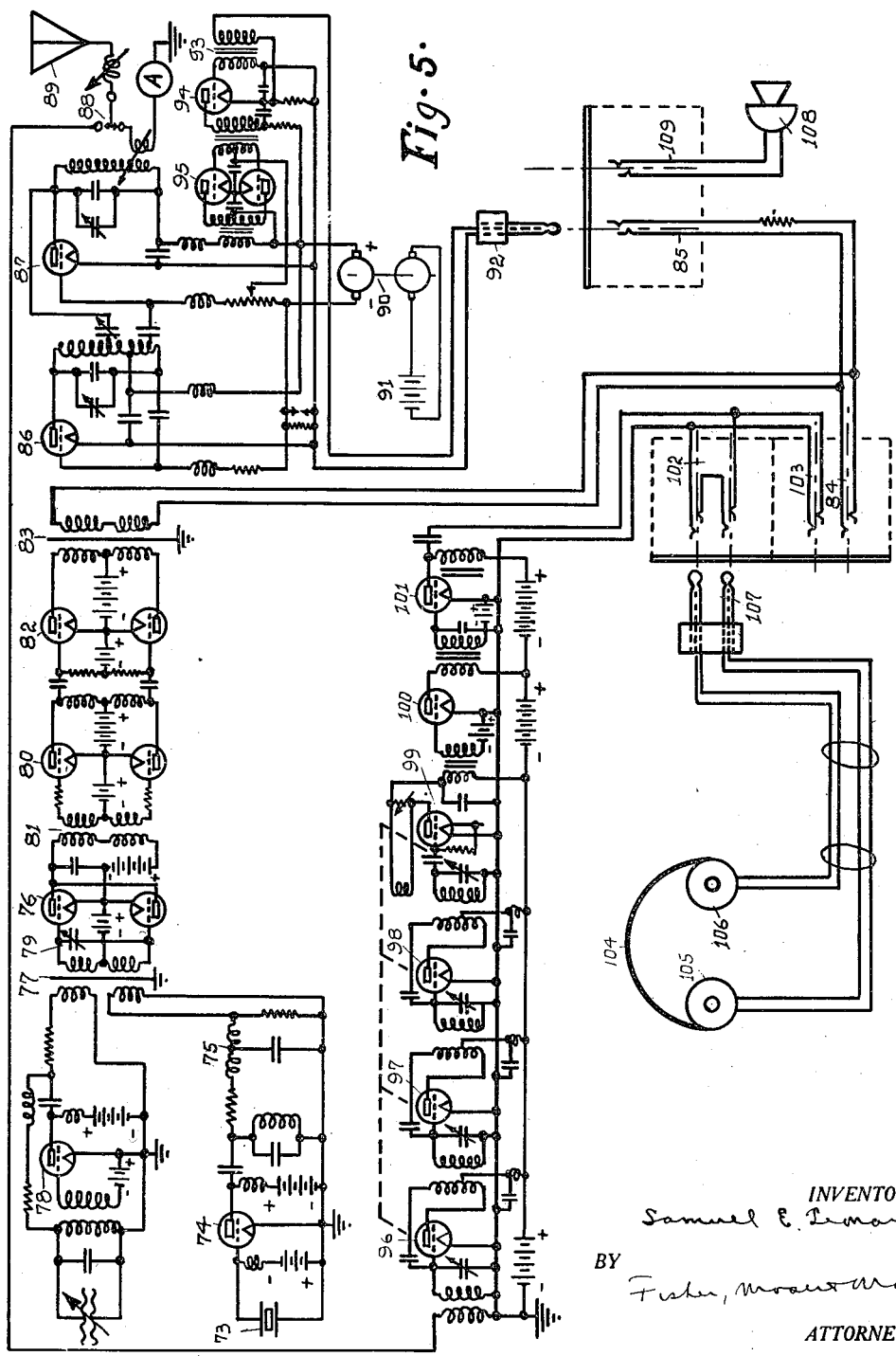

July 23, 1935.  S. E. LEONARD, JR  2,008,832
METHOD OF RATING AND COMPARING QUANTITIES
Filed June 26, 1933  5 Sheets-Sheet 5
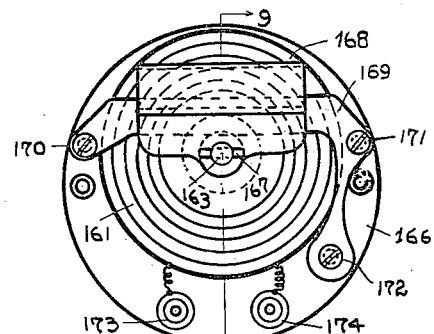
Fig. 7.
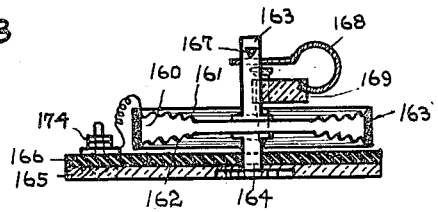
Fig. 9
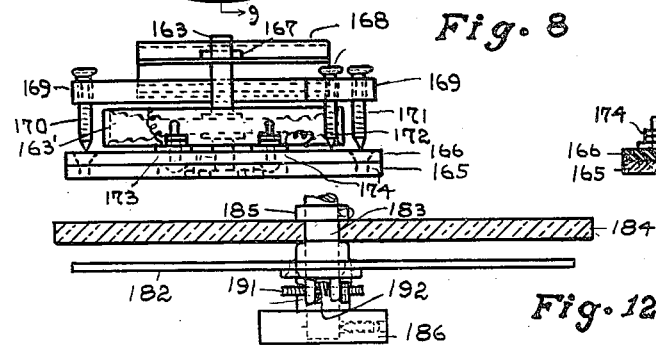
Fig. 8
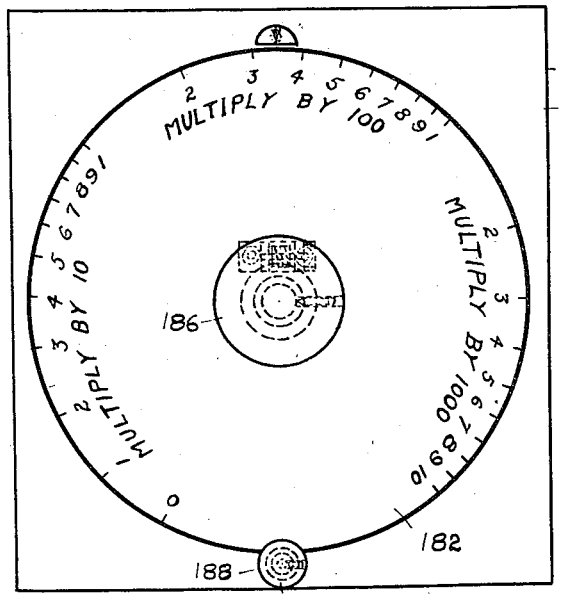
Fig. 11
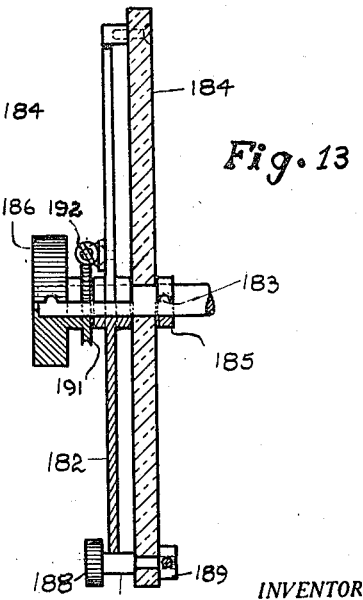
Fig. 12
Fig. 13
INVENTOR.
Samuel E. Leonard Jr
BY
Fisher, Moser & Moore
ATTORNEY.

Patented July 23, 1935

2,008,832

UNITED STATES PATENT OFFICE 2,008,832

METHOD OF RATING AND COMPARING QUANTITIES

Samuel E. Leonard, Jr., East Cleveland, Ohio

Application June 26, 1933, Serial No. 677,753

13 Claims. (Cl. 250—1)

This invention relates to a method of rating and comparing spatio-temperal quantities, such as altitudes and is applicable for air craft work, topographical work, barometric measurements, gage work for rating or comparing materials and liquids etc. The principal object of the present invention is to provide a method and means for automatically rating quantities such as altitudes in frequencies of electric oscillating circuits, by comparing frequencies governed by one altitude with other frequencies governed by another altitude for determining the relative or real altitudes. As known the frequency of an electric oscillating circuit is principally governed by the ratio of the quantities, capacity, resistance and self-induction with respect to each other, therefore an automatic change of the ratio of these quantities will cause a change of the frequency or natural period of an oscillating circuit. I have found that atmospheric pressure variations can be utilized for automatically changing the frequency of an oscillating circuit and that the resulting change in the frequency of the circuit can be directly metered in altitudes, or can readily be compared (for measurement purposes) with the frequency of a remote oscillating circuit having a predetermined frequency governed by its altitude.

Change in the period of an oscillating circuit resulting from air pressure variations can be automatically effected according to the present invention, by the use of a variable condenser resembling in general an aneroid barometer with the exception that the two oppositely arranged diaphragms of the barometer are electrically insulated from each other. Such period change can also be obtained by coupling an aneroid barometer or a battery thereof with conventional variable condensers, or by means of specifically built vacuum tubes embodying means for automatically changing their inner electrode capacity. Tubes of this type are described in my copending application Serial No. 677,752 filed June 26, 1933. It is obvious that oscillating circuits for metering barometric pressures or altitudes may oscillate in radio, audio or beat frequencies.

The above and other novel features of my invention and their advantages will best be understood by reference to the following description, taken in connection with the accompanying drawings in which:

Figure 1 shows a block diagram of a receiving station adapted to receive electric oscillations from a remote point for comparison of the frequency of these oscillations with the frequency of a local oscillating circuit. The oscillations received at the receiving station are for example, sent from an aeroplane including a sender installation such as shown in the block diagram of Figure 2, which installation transmits electric oscillations of a frequency proportionate to the height of the aeroplane above ground.

Figure 5 shows a diagrammatic wiring diagram of an installation adapted to be used as the sender station of an aircraft;

Figure 10:
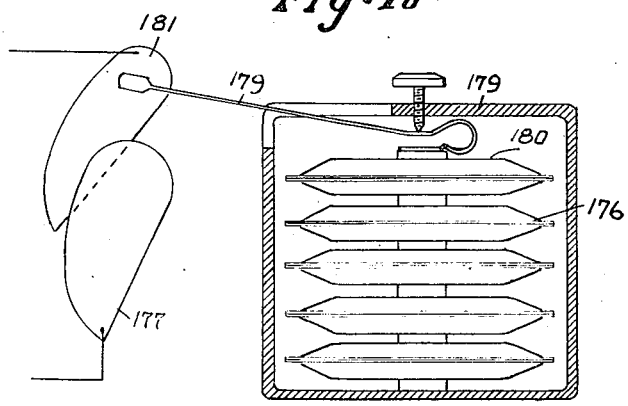

Figures 7, 8 and 9 show plan, side and cross sectional views of a practical form of pressure operated variable condenser installed in the sender and receiver stations referred to above, cross sectional view 9 being taken on line 9—9 of Figure 7;

Figure 10 shows in diagram a variable condenser actuated by and coupled with an aneroid barometer;

Figures 11, 12 and 13 are plan and cross sectional views of a calibrated dial for a calibrated condenser, the sections of Figures 12 and 13 being taken on lines 12—12 and 13—13 of Figure 11.

In comparing and rating spatio-temperal quantities such as altitudes, the receiving and the sending station (see block diagrams Figures 1 and 2) are each provided with automatically operated pressure condensers or barometer condensers. This arrangement permits accurate comparison of the frequencies in all cases where the sender station, for example an aeroplane, is relatively closely related to the receiving station so that the atmospheric conditions in the locality of the two stations are practically uniform.

In the block diagram of the ground or receiving station shown in Figure 1 all instruments and apparatus are taken from standard radio equipment with the exception of barometer condenser 4, which will later be described. The apparent complication of the diagram is due to the use of frequency meters now on the market, these meters being designed only for oscillation within narrow and low ranges. The two radio frequency oscillating circuits 1 and 2, that is, oscillator A which includes barometric condenser 4 as a component element and oscillator C which includes calibrated condenser 11 as a component element respectively, beat with ratio frequency oscillating circuit 3, that is, oscillator B, which includes quartz crystal 7 as a component element creating a steady constant frequency, to produce oscillations of audio frequency beat notes. Oscillations of circuit 1 are controlled by barometer condenser 4, whereas the oscillations of circuit 2 are controlled by a calibrated condenser or indicator 11. Oscillating circuit 3 is controlled by a quartz crystal 7, which causes a constant output frequency to be sent into a low pass filter 9 for filtering out all extraneous and harmonic frequencies in order to produce a suitable pure and steady frequency of this circuit. The filtered output of circuit 3 is fed into detectors 5 and 13 which are coupled with circuits 1 and 2 respectively. It will now be seen that the output of circuits 1 and 3 mixing in detector 5 produces a beat frequency of audio range which after amplification in amplifier 6 is fed through wire 20 to double pole switch D.

The output frequency of circuit 2, which frequency is proportionate to the dial setting of calibrated condenser 11, is mixed in detector 13 with the output frequency of oscillating circuit 3, therefore the beat note of the two mixed frequencies amplified in amplifier 14 and fed through wire 22 into detector 17 is a function of the calibrated dial setting of condenser 11.

Double pole switch D is connected with detectors 15—17, an amplifier 14 and a receiving set 10, wires 23, 24, 25 and 26 being used for this purpose. The receiving set 10 may be any suitable receiver of conventional design adapted to bring in the remote station which is sending the frequency to be checked.

Figure 1:
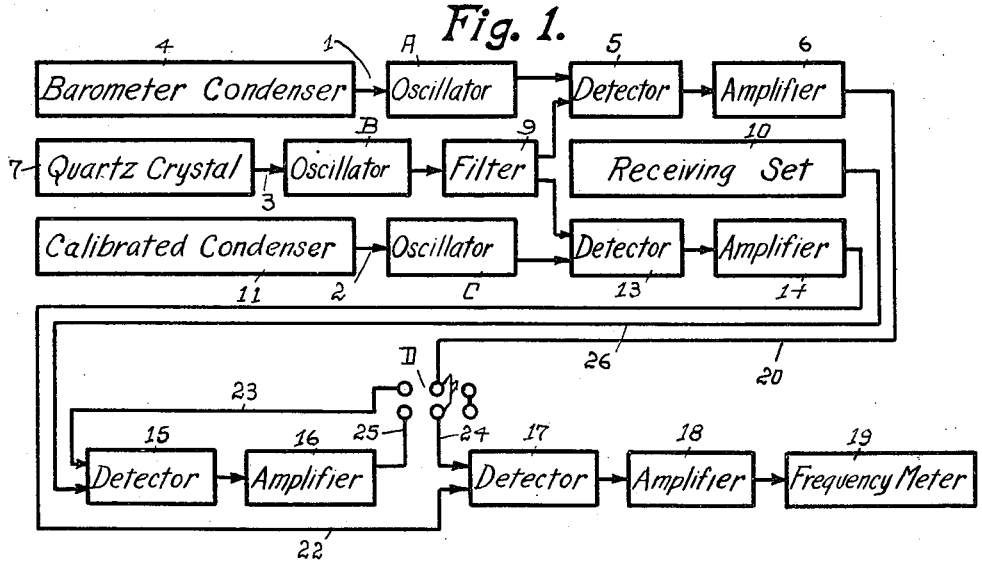

Assuming that switch D is thrown to the right, Figure 1, then the output of amplifier 6 is fed into detector 17, where it mixes with the output of amplifier 14. The resulting beat frequency is amplified in amplifier 18 and then fed into the frequency meter 19 to indicate zero beat. This can be effected by tuning the dial of calibrated condenser 11 until zero beat is indicated in said frequency meter, that is until the frequencies from amplifiers 6 and 14 are the same. Under these conditions the reading of the calibrated condenser dial setting will be a function of the air pressure on barometer condenser 4. If it is desired to make the air pressure at this level a basis for measurements, the calibrated condenser is turned to read zero beat in frequency meter 19, by means of a zero adjusting condenser of common construction, which zero adjusting condenser is arranged in the same circuit with calibrated condenser 11. It will therefore be seen that when switch D is in the position just described, the device can be used in the adjustment of the dial of calibrated condenser 11 to the air pressure then existing, and before measurements are taken. In other words the output of amplifiers 6 and 14 are two different audio frequencies created by beating the combined tuned radio frequency circuits "1" and "3" and "2" and "3" respectively. These two audio frequencies are then mixed in modulator or detector 17 to create a new audio frequency which will be the difference of the two foregoing audio frequencies.

For measuring purposes it is necessary to throw the switch D into left hand position, Figure 1, so that the frequency output of amplifier 6 is fed through wires 20 and 23 into detector 15 and mixed with the output of receiving set 10, which is connected through wires 26 to detector 15. The beat frequency output of detector 15, resulting from the difference of the frequency of the remote station received by receiver 10 with an audio frequency output and the local frequency from amplifier 6, which latter is a function of the air pressure as previously brought out, is amplified in amplifier 16 and mixed in detector 17 with the output frequency of amplifier 14. The beat note of detector 17 is amplified in amplifier 18 and indicated in the frequency meter 19 by turning the calibrated dial of condenser 11 until this beat note is zero. The reading of the calibrated condenser therefore accurately indicates the difference in altitudes of the local station and the remote station.

Figure 2:
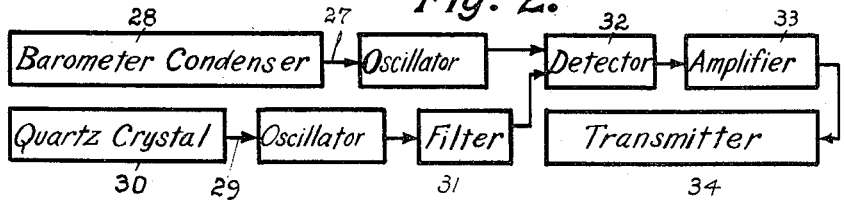

The receiver 10 of the receiving station previously described picks up the signals of the remote station, for example an aeroplane, which carries a suitable arrangement of equipment, such as diagrammatically shown in Figure 2 of the drawings. This equipment embodies an oscillating circuit 27 having as an element in this circuit barometer condenser 28 and an oscillating circuit 29 having as an element of control quartz crystal 30, which latter causes a constant frequency output to be sent into filter 31 for filtering out all extraneous and harmonic frequencies in order to produce a suitable pure and steady frequency of oscillating circuit 29. The output of the two oscillating circuits mix in detector 32 and the resulting beat frequency, a function of barometer condenser 28, is sent out by means of a radio telephony transmitter 34, after amplification through amplifier 33. The regular transmitting equipment of an aircraft can be used for transmitting the beat frequency signals.

The described equipment is applicable for other purposes than measuring air pressures or altitudes as for example for making remote gasoline oil or water tank measurements, remote electric meter indications etc.

Figure 3:
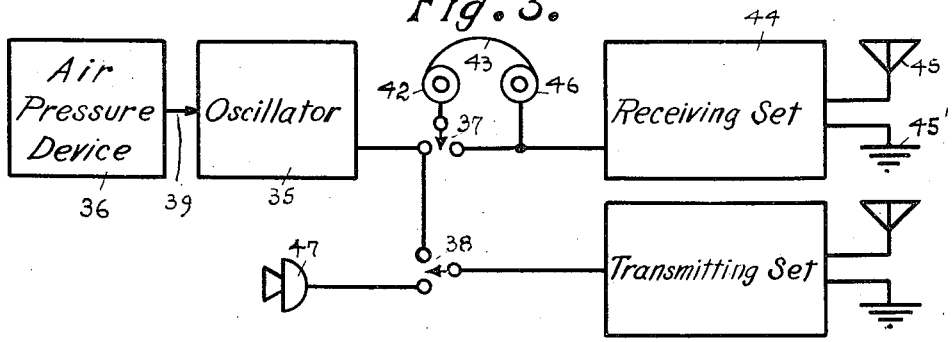
Figures 3 and 4 show block diagrams of receiving and sending stations of somewhat simplified construction.
Figure 4:
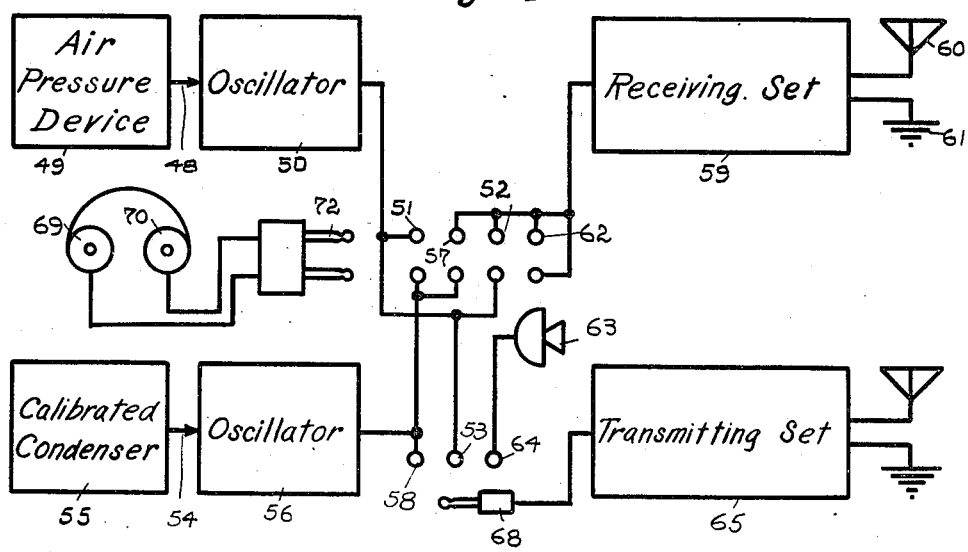

The block diagrams of Figures 3 and 4 illustrate simplified lay outs in which a head telephone set replaces the detectors, amplifiers and the frequency meter. The switching arrangement of these lay outs permits more freedom in the use of the equipment for the purpose desired. The sender station equipment shown is such as commonly used, for example, by an aircraft. This equipment includes the ordinary radio equipment of an aeroplane and a small oscillator 35, which may be of the audio type or a beat frequency oscillator made up from the combined equipment previously described, an air pressure device 36 and the necessary switches 37, 38. The additional equipment adds little weight to the aeroplane and can conveniently be placed thereon.

The arrangement of parts and instruments will best be illustrated by describing the method of operation. Assuming that switch 37 is thrown to the left, the frequency of oscillating circuit 35, governed by air pressure device 36 and oscillator 35 will then be audible in phone 42 of head phone set 43. Receiving set 44 with its receiving antenna 45 and counterpoise 45' picks up the frequency of the remote station, which frequency is proportional to the height of said station, and will be heard in phone 46. Consequently the aviator can compare the frequencies of the two notes in phones 42 and 46 and after little practice accurately determine his altitude with respect to the remote station. Turning of switch 38 upwardly connects the oscillating circuit 35 with the transmitting device so that the remote station can determine the altitude of the aircraft. When switches 37 and 38 are turned in reverse directions to that just described the oscillating circuit 35 is cut out and the operator may use his equipment for radio communication over microphone 47 and head phones 42 and 46.

The block diagram shown in Figure 4 represents the equipment used at a ground station or on a dirigible. In this diagram the output frequency of oscillator 50 is governed by air pressure device 49 and oscillator 50 so that the frequency of this circuit is a function of the barometric air pressure. The output of circuit 48 is led to double jacks 51 and 52 and to single jack 53, and the output frequency of oscillator 56 embodying calibrated condenser 55 and oscillator 56, which frequency is a function of the dial setting of condenser 55, is led to double jacks 51 and 57 and to single jack 58. Finally the output of receiving set 59, including antenna 60 and counterpoise 61, is led to double jacks 57, 52 and 62. Microphone 63 is connected to single jack 64, transmitting set 65 with antenna 66 and counterpoise 67 is connected to a single telephone plug 68. The individual phones 69 and 70 of head phone set 71 are connected to double plug 72.

When plug 72 is inserted into double jack 51, the output frequency of oscillators 50 and 56 are audible in the respective phones 69 and 70 of head phone set 71. In this position the calibrated condenser 55 can be adjusted, by turning the condenser dial to zero and manipulating a zero adjusting condenser (not shown) until the tones in phones 69 and 70 are identical. When double plug 72 is inserted into double jack 57 the output of receiving set 59 and the output of oscillator 56 will be heard in the respective phones. In this position of plug 72 the dial of the calibrated condenser 55 is turned until the notes in phones 69 and 70 are the same, so that the position of the dial of the calibrated condenser is a measure for the incoming frequency. The dial of the condenser 55 may of course be calibrated in pounds of pressure, inches of mercury, or feet of altitude.

When double plug 72 is inserted into double jack 62, the receiving set 59 is connected to both phones so that the receiver can be used for normal reception. Single plug 68, when inserted into jack 58, connects the transmitting set 65 with oscillating circuit 54, and when inserted into jack 53 connects transmitting set 65 with oscillating circuit 48. Finally when plug 68 is inserted in jack 64 the microphone 63 is connected with the transmitting set for normal speech transmission. The transmission of the output of oscillating circuit 54 to the remote station imparts the necessary frequency to permit the dial of the calibrated condenser of this station to be set to its correct position, and the transmission of the output of the oscillating circuit 48 to said remote station permits the operator at the latter station to make measurements or compare his altitude with respect to the sender station.

The wire diagram of Figure 5 is identical with the block diagram of Figure 3, adapted for use on aircraft. This diagram in addition to the conventional equipment of an aeroplane also includes a beat frequency oscillator and an air pressure device, making the frequency of the oscillator a function of the air pressure. Numerals 73 to 83 inclusive indicates the different parts of the beat frequency oscillator. Thus a quartz crystal 73 insures a constant frequency of oscillation of the vacuum tube circuit 74, the output of which is filtered in the low pass filter 75 and then fed into the balanced modulator 76 through a transformer 77. The output of an oscillator 78 is also fed through transformer 77 into the balanced modulator 76. The output of oscillator 78 is controlled by a variable condenser 79 across the secondary of transformer 77. Balanced modulator 76 is coupled with an amplifier 80 through a transformer 81 in such a way that a low pass filter action is insured. Finally the output of amplifier 80 is fed into a power amplifier 82 and thence through an output transformer 83 into jacks 84 and 85.

The wiring diagram of the transmitting set of Figure 5 diagram is indicated by numerals 86 to 95 inclusive. This transmitting set includes a master oscillator circuit 86, which feeds into the power amplifier circuit 87, where the radio frequency of the master oscillator circuit 86 is modulated in the plate circuit of the power amplifier before it is fed through relay 88 into the antenna 89. Direct current voltage is supplied from a motor generator 90 operating from the 12 volt storage battery 91 of the aeroplane. The frequency to be transmitted is fed from plug 92 through the input transformer 93 to vacuum tube 94, where it is amplified before being fed into modulator tube 95.

When relay 88 is in receiving position, the antenna is connected to the receiving set, indicated by numeral 96 to 109 inclusive. This receiving set embodies three stages or tuned radio frequency amplification circuits 96, 97 and 98, the regenerative detector 99, and two stages of audio frequency amplification 100 and 101. The output of the receiving set is fed into jacks 102 and 103. A head phone set 104 with ear phones 105 and 106 is connected to a double plug 107 which may be plugged into double jack 102 or single jacks 84 and 103, and a microphone 108 connected to a single jack 109 may be connected with plug 92 or the latter may be plugged into single jack 85. As the wiring diagram just described is identical with the block diagram of Figure 3, the operation of which has been fully described, further explanation is deemed unnecessary.

Figure 6:
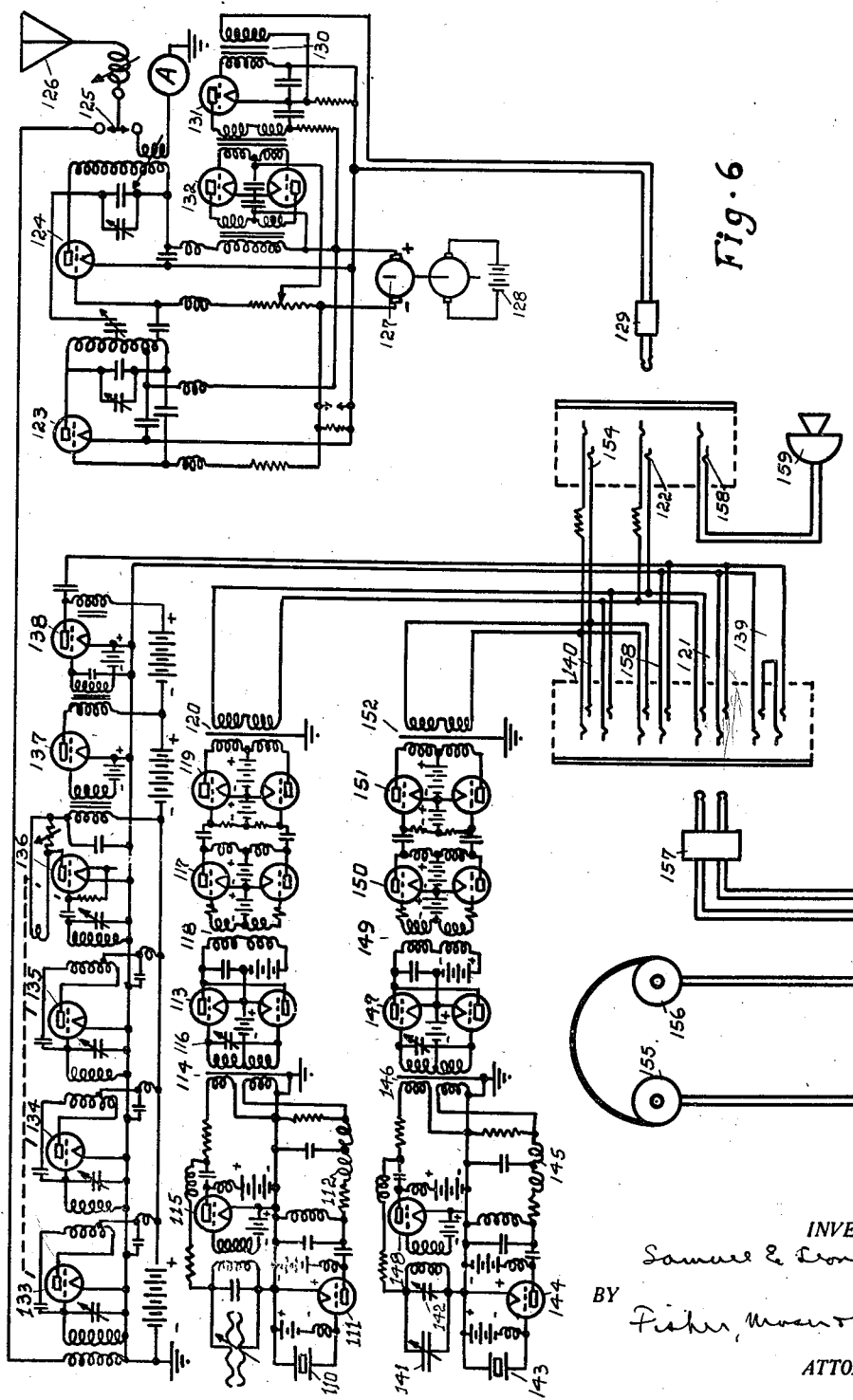
Figure 6 is a diagrammatic wiring diagram of the ground or receiver station.

The wire diagram of Figure 6 is identical with the block diagram of Figure 4, adapted for ground or receiving station usage. Figure 6 diagram is somewhat similar to the diagram shown in Figure 5 and includes in addition to the conventional radio station equipment, a beat frequency oscillator, an air pressure device for making the frequency of the oscillator a function of the air pressure, and a second beat frequency oscillator controlled by a calibrated condenser.

Numerals 110 to 120 inclusive indicate the different parts of the first beat frequency oscillator. Thus, a quartz crystal 110 insures constant frequency of oscillation of the vacuum tube circuit 111, the output of which is filtered in the low pass filter 112 and then fed into the balanced modulator 113 through a transformer 114. The output of an oscillator 115 is also fed through transformer 114 into the balanced modulator 113. The output of oscillator 115 is controlled by a variable condenser 116 across the secondary of transformer 114. Balanced modulator 113 is coupled with an amplifier 117 through a transformer 118 in such a way that a low pass filter action is insured. Finally the output of amplifier 117 is fed into a power amplifier 119 and thence through an output transformer 120 into jacks 121 and 122.

The wiring diagram of the transmitting set is indicated by numerals 123 to 132 inclusive. This transmitting set includes a master oscillator circuit 123, which feeds into the power amplifier circuit 124, where the radio frequency of the master oscillator circuit 123 is modulated before it is fed through relay 125 into the antenna 126. The direct current voltage supply is secured from a motor generator 127 operating from a battery 128. The frequency to be transmitted is fed from plug 129 through the input transformer 130 to vacuum tube 131, where it is amplified before being fed into modulator tubes 132.

The receiving circuit embodies three stages of tuned radio frequency amplification circuits 133, 134 and 135, a generative detector 136, and two stages of audio frequency amplification 137 and 138. The output of the receiving circuit is fed to jacks 139, 121 and jack 130, and the output of the beat frequency oscillator is fed to jacks 121, 122 and 140.

The second beat frequency oscillator designated in part by numerals 141 to 152 inclusive, is quite similar to the beat frequency oscillator previously described. The frequency of this second beat frequency oscillator is controlled by a calibrated condenser 141, provided with a suitably graduated dial so that direct readings can be had. A zero adjusting condenser 142, shunted with respect to the calibrated condenser 141 permits adjustment to zero beat as previously described. The quartz crystal 143 controls the frequency of the oscillating circuit 144, the output of which is filtered in filter 145 and then fed through transformer 146 into the balanced modulator 147. The output of the oscillator 148, controlled by calibrated condenser 141, is also fed into balanced modulator 147. The beat note of this modulator passes through transformer 149 and the low pass filter arrangement into amplifier 150 and 151, before passing through the output transformer 152 into jacks 153, 140 and 154. Jacks 139, 121, 153 and 140 can be connected to an earphone set including phones 155, 156 by means of a plug 157 and jacks 154, 122 and 158, the latter of which, being connected to a microphone 159 can be connected with the sender by means of plug 129.

The diagrams hereinbefore described include a barometer condenser adapted to make the frequency of the signals a function of the air pressure. Such a barometer condenser, may consist of an evacuated chamber 160, having yielding opposite walls or diaphragms 161, 162 insulated from each other by insulating material 163' (see Figures 7, 8 and 9). These diaphragms centrally support rods 163 and 164 respectively, rod 164 being rigidly secured to a base plate 165, covered by a layer of insulating material 166, and rod 163, being yieldingly supported by means of a knife bar 167 secured to said rod and resting on a spring 168, supported by an adjustable bracket 169. This bracket is made of insulating material and supported on adjusting screws 170, 171 and 172, which screws bear upon the insulating material 166 of base plate 165 and permit horizontal and vertical adjustment of bracket 169 if desired. It will be seen that rod 163 being under constant outward tension or pull, will prevent collapse of the diaphragms under the effect of air pressure until the tension of spring 168 has been overcome. The two diaphragms form the plate of a condenser and are electrically connected to binding posts 173, 174 mounted on the insulating material 166 of base plate 165.

It should be understood that any device the capacity of which changes under pressure variations may of course be used in the place of the described barometer condenser. Thus mechanical devices automatically actuated by pressure variations and coupled with variable capacities may be used with the same results. A diagrammatic view of such an arrangement is shown in Figure 10 of the drawings. In this figure an aneroid barometer 176 actuates a variable condenser 177 by means of a lever 178, pivotally secured to the frame 179 of the barometer and connected at its opposite ends to the yieldable diaphragm 180 of the aneroid barometer and the movable blades 181 of variable condenser 177. It will be obvious that liquid barometers may be used with the same effect as aneroid barometers and possibly with greater efficiency in exact adjustment. Furthermore, changes of capacity by pressure variations may be obtained by using special vacuum tubes of the type disclosed in my copending application previously mentioned herein. The change of the capacity of these tubes is caused by changing the physical relationship of the electrodes, by deformation of one or more yielding diaphragms forming part of the wall of the tube, which diaphragms support the inner electrodes of the tube.

In Figures 11 to 13 I have shown a preferred form of calibrated dial 112 for the calibrated condenser which varies the output frequency of the beat frequency oscillator. This dial preferably embodies a logarithmic calibration to permit of substantially accurate readings where most desirable. For example, if the dial is calibrated in feet altitude, the readings for low altitudes will be very accurate although direct readings may be made up to 10,000 feet. Dial 182 is pivotally mounted on a main shaft 183, connected to a variable rotary condenser (not shown) and held in proper position with respect to the panel board 184 by means of collar 185. The front end of shaft 183 carries a dial knob 186, securely fastened to said shaft by a set screw 187. Dial knob 186 provides for quick approximate adjustments while shaft 190 having a small knob 188 is used for vernier adjustments. Shaft 190 is preferably pivotally extended through the bottom portion of panel board 184 and held in proper position by means of a collar 189 secured to the extended end portion of the shaft. This shaft is covered with rubber or similar material for frictional driving engagement with the circumferential edge of dial 182. Dial 182 is adjustably connected with dial knob 186 by means of a worm gear 191, secured to knob 186 and a worm shaft 192 secured to dial 182, so that rotation of worm shaft 192 causes relative rotation of dial 182 and knob 186 with respect to each other.

It will be seen from the foregoing that the pilot of an air craft can make height measurements with the equipment described while listening to directional signals. As there is no necessity for employing a special radio channel, the invention can be practiced with the present cross country route systems. My method or rating and comparing spatio-temperal quantities is particularly applicable for aircraft work to determine the height of aircrafts with respect to each other or to the ground and will also be of great help in landing the aircrafts on a mothership or on the ground. The method may also be used effectively for determining the height of an aeroplane flying through the mountains. For the latter purpose equipment such as shown in Figures 4 and 6, or the sender station thereof together with the pressure operated beat frequency oscillator, may be installed on mountain peaks for continuously transmitting the necessary beat frequency so that an aviator may determine his proper height with respect to the mountain peaks to be crossed. In such case the air pressure devices or pressure condensers on the sending and receiving station are subjected to substantially the same general air conditions due to the proximity of the stations with respect to each other and consequently the readings will be very accurate.

The invention may also be employed to good advantage in making topographical maps, as it permits of accurate determination of elevations at the points in question.

While I have described the principles of operation of my invention together with apparatus for practicing the invention, I wish it to be understood that the apparatus shown and described herein is merely illustrative and that I do not restrict my invention to any particular apparatus.

Having thus described my invention, what I claim is:

1. In a method of rating and comparing the heights of the two spaced points by means of their atmospheric pressure differences, the steps of creating at one point at low beat frequency between two oscillating circuits having high frequencies, making one of the two oscillating circuits a function of the atmospheric pressure at the said point creating a second low beat frequency at the other point and making this second frequency a function of the atmospheric pressure at the other point and comparing the low beat frequencies at the same time with each other.

2. In a method of rating and comparing the heights of two spaced points by means of their atmospheric pressure differences the steps of creating at one point an audio beat frequency, between two oscillating circuits of radio frequency, creating at the other point an audio beat frequency between two oscillating circuits of radio frequencies making the two audible beat frequencies a function of the respective barometric pressures of said points and rating the heights of said points with respect to each other and comparing the audible beat frequencies with each other.

3. In a method of rating and comparing the heights of two spaced points by means of their atmospheric pressure differences the steps of creating at one of said points an audio beat frequency between two oscillating circuits oscillating in radio frequency, making this audible beat frequency a function of the barometric pressure at this point, rating the audio beat frequency by comparison with a second audio beat frequency of predetermined period created at the said point, creating at the other of said points an audio beat frequency between two oscillating circuits of radio frequencies, making the latter audio beat frequency a function of the air pressure at the other point, transmitting this latter audio frequency to said first point and comparing the two audible beat frequencies with each other.

4. In a method of rating and comparing the heights of two spaced points according to claim 3 the additional steps of bringing the two audible beat frequencies to zero beat for exact determination of the frequency difference between these audible beat frequencies.

5. In a method of rating and comparing the heights of spaced points by means of their atmospheric pressure differences, the steps of creating at one of said points an audio beat frequency between an oscillating circuit, the oscillations of which are a function of the barometric pressure at this point and an oscillation circuit of a constant frequency, in rating the audio beat frequency with a second audio beat frequency by bringing the two audio beat frequencies to a zero beat, creating at the other of said points an audio beat frequency between two oscillating circuits, making the latter audio beat frequency a function of the air pressure at the other point, transmitting this latter audio frequency to said first point and comparing the latter audio beat frequencies at said point by bringing this frequency to zero beat with the second audio beat frequency at this point.

6. In an apparatus for comparing and rating the heights of spaced points by means of their atmospheric pressure differences, an electric oscillator, an automatically variable condenser coupled with said oscillator having its plates separated by an airtight yielding chamber to change the condenser capacity and frequency of said oscillator in accordance with atmospheric pressure variations, a receiving set adapted to pick up electric waves sent from a distant point, the frequency of which waves is a function of the atmospheric pressure at said distant point and means to compare and rate the frequency of said circuit and the frequency of the picked up electric waves at the same time with each other.

7. In an apparatus for comparing the heights of spaced points by means of their atmospheric pressure differences, an electric oscillating circuit, an automatically variable condenser within said circuit having its plates separated by an airtight yielding chamber to change the capacity of the condenser and the frequency of said oscillator in accordance with atmospheric pressure variations, a receiving set adapted to pick up electric waves sent from a distant point, the frequency of which waves is a function of the atmospheric pressure at said distant point and a telephone ear set having one phone coupled with said oscillating circuit and its other phone coupled with said receiving set to permit comparison of the frequency of said oscillator with the frequency of said incoming waves.

8. In an apparatus for comparing the heights of spaced points by means of their atmospheric pressure differences, radio frequency oscillators coupled to produce an audio beat note, one of said oscillators including automatically variable condenser means having its plates separated by yielding air tight chamber for changing the capacity of said condenser in accordance with atmospheric pressure variations so that the audio beat note is a function of the atmospheric pressure, a receiving set adapted to pick up an audio beat frequency sent from a remote point, which note is a function of the air pressure at said remote point, and a telephone ear set having one phone coupled with said beat note oscillator to reproduce the sound of said beat note and its other phone to said receiving set to reproduce the sound of the beat note received from said remote point.

9. The combination of a sender station having an oscillator, automatically variable, pressure operated tuning means for changing the tuning of said oscillator in accordance with atmospheric pressure changes with an apparatus substantially remote from said sender station embodying a receiving set for picking up the waves of said sender station, said apparatus including an oscillator, an automatically variable pressure operated tuning means for changing the tuning of said latter oscillator in accordance with atmospheric pressure changes, and means coupled with said receiving set and the oscillator of said apparatus for comparing and rating the frequency of the incoming waves of said sender station with the frequency of said oscillator of said apparatus.

10. The combination of a sender station embodying a radio frequency oscillator, means whereby the frequency of said oscillator is controlled in accordance with atmospheric pressure changes, a second radio frequency oscillator of constant frequency and means for producing a beat note between the oscillations of said two oscillators, with an apparatus substantially remote from said sender station embodying a receiving set for picking up the beat note of said sender station, a radio frequency oscillator, means whereby the frequency of said last oscillator is controlled in accordance with atmospheric pressure changes, a second radio frequency oscillator of constant frequency, means for producing a beat note between the oscillations of the two oscillators of said apparatus, and means coupled with said receiving set and the means producing a beat note in said apparatus for comparing and rating the beat note of said sender station with the beat note of said apparatus.

11. The method of determining altitude between an elevation and a lower point of reference, which comprises generating high frequency waves under control of barometric pressures at said elevation and at said point, respectively; co-ordinating said waves to produce a resultant beat whose frequency represents the pressure differential of said elevation relative to said point of reference; and detecting and evaluating said beat frequency in terms of altitude.

12. The method of determining the altitude of aircraft which comprises the step of generating a high frequency wave on the craft; controlling the frequency of said wave in response to barometric pressure at the flight level of the craft; generating a second high frequency wave at ground level; controlling the frequency of said second wave in response to barometric pressure at said ground level; combining the two waves to produce a resultant beat frequency; and detecting and evaluating said beat frequency in terms of altitude.

13. Means for determining the altitude of aircraft above a given ground level, comprising sources of high frequency energy carried by said craft and located at said ground level, respectively; means responsive to barometric pressure and associated with each source to control the frequency outputs thereof; circuit means to co-ordinate the energy outputs of said sources to produce a beat frequency representing the pressure differential at the position of said craft relative to said ground level, said means including a variable capacity calibrated to indicate altitude of the craft in accordance with variations necessary to maintain zero beat note.

SAMUEL E. LEONARD, Jr.